United States Patent [19]

Kumar et al.

[11] Patent Number: 4,936,610
[45] Date of Patent: Jun. 26, 1990

[54] DIFFERENTIAL CREEPAGE CONTROL SYSTEM FOR OPTIMIZING ADHESION OF LOCOMOTIVES

[75] Inventors: Sudhir Kumar; Shiv R. Kumar, both of Westmont, Ill.

[73] Assignee: Tranergy Corporation, Westmont, Ill.

[21] Appl. No.: 324,259

[22] Filed: Mar. 15, 1989

[51] Int. Cl.$^5$ .............................................. B61C 15/08
[52] U.S. Cl. ......................................... 291/2; 318/52; 180/197; 361/238
[58] Field of Search ...................... 180/197; 364/426.3; 303/20; 361/238; 318/52; 291/2; 246/182 R, 182 C

[56] References Cited

U.S. PATENT DOCUMENTS

| | | | |
|---|---|---|---|
| 3,437,896 | 4/1969 | Hoge | 318/52 |
| 3,982,164 | 9/1976 | de Buhr et al. | 318/52 |
| 3,997,822 | 12/1976 | Logston, Jr. et al. | 318/52 |
| 4,701,682 | 10/1987 | Hirotsu et al. | 318/52 |

OTHER PUBLICATIONS

"Wheel-Rail Wear and Adhesion with and without Sand for a North American Locomotive", A.S.M.E. Journal of Engineering for Industry, Kumar et al., May 1986, vol. 108, pp. 141–147.
"Locomotive Friction-Creep Studies", A.S.M.E. Joint Railroad Conference, Montreal, Apr. 1980, Logston et al.

Primary Examiner—Andres Kashnikow
Assistant Examiner—Mark T. Le
Attorney, Agent, or Firm—Kinzer, Plyer, Dorn, McEachran & Jambor

[57] ABSTRACT

This invention concerns a creepage control system for locomotives that optimizes adhesion while minimizing wasted energy, rail/wheel wear and shock loading on the drive train. The basis of the invention is to always maintain a small but positive value of the slope of the wheel-rail adhesion creep curve (or differential of adhesion versus creep) for all traction axles of the locomotive through microprocessor control. The value of the differential of adhesion versus creep is used to define an operating window for control and operation of motors continually in the optimum domain when high adhesion is demanded. When, due to a sudden increase in rail contamination, the value of the control function becomes negative, the microprocessor control reduces the generator excitation in stages until the function becomes positive and inside the operating window again. The microprocessor controls a rail cleaning system which is turned on or off depending on the cleanliness of the rail. It also controls a rail sanding system which is turned on or off depending on the magnitude of wheel creep.

26 Claims, 12 Drawing Sheets

ADHESION $\mu \sim$ TORQUE OF MOTOR
$\sim$ MOTOR CURRENT I $$\therefore \frac{\Delta \mu}{\Delta t} \sim \frac{\Delta I}{\Delta t}, \quad t - \text{TIME} \qquad \text{EQ. 1}$$

CREEP $$\xi = \frac{nR_w - V_2}{V_2} \qquad \text{EQ. 2}$$

$R_w$ - WHEEL DIAMETER, GEAR RATIO RELATED CONSTANT
$V_2$ - TRAIN SPEED
$n$ - MOTOR RPM

DIFFERENTIATING EQ. 2 FOR A SMALL TIME INCREMENT, NEGLECTING SECOND ORDER TERMS AND ASSUMING THAT TRAIN ACCELERATION IS NOT LARGE, i.e. $(dV_2/dt) \simeq 0$ $$\frac{\Delta \xi}{\Delta t} \sim \frac{\Delta n}{\Delta t} \qquad \text{EQ. 3}$$

DIVIDING EQ. 1 BY EQ. 3 GIVES:

$$\frac{\Delta \mu}{\Delta \xi} \sim \frac{\Delta I}{\Delta t} \bigg/ \frac{\Delta n}{\Delta t} = \frac{\Delta I}{\Delta n} \qquad \text{EQ. 4}$$

FROM EQ. 4 WE CAN CONCLUDE THAT:

$$\boxed{\frac{\Delta I}{\Delta n} \text{ CAN BE USED FOR CONTROLLING } \frac{\Delta \mu}{\Delta \xi}}$$

FIG. 3

SYSTEM STATUS DESCRIPTION

1. OUTPUT TO ENGINEER - WHO HAS CONTROL ?
   [SAAS OR LOCO ENGINEER]

2. GET STATUS OF EMERGENCY OVERRIDE OF COMPUTER
   [ON OR OFF]

3. GET STATUS OF BRAKE SYSTEM
   [ON OR OFF]

4. IF (POWER IS BEING DECREASED AND $f > 0$)
   THEN TURN COMPUTER OVERRIDE ON

5. IF [(POWER IS BEING INCREASED AND $f < \gamma_2$) OR
   (POWER IS BEING DECREASED AND $f \leq 0$)]
   THEN TURN COMPUTER OVERRIDE OFF

6. GET CLEANING OVERRIDE SYSTEM STATUS
   [ON OR OFF]

7. GET SANDING OVERRIDE STATUS
   [ON OR OFF]

8. GET SYSTEM CHECK STATUS
   [O.K. OR MALFUNCTION]

FIG. 12

DIFFERENTIAL CREEPAGE CONTROL SYSTEM FOR OPTIMIZING ADHESION OF LOCOMOTIVES

BACKGROUND OF THE INVENTION

Traditionally it has been a common practice for locomotive designers to limit the creepage or slip of the wheels on the rail to approximately one percent in order to avoid the condition of total wheel slip which results in rail or wheel burn. It was determined later that the wheel/rail contact has considerably more unused capacity to produce adhesion beyond one percent creepage.

An improvement in the locomotive adhesion and traction capacity was achieved in a second generation control system called the creepage control. In this approach, controlled wheel slip is provided in a way which limits the maximum wheel slip and yet allows sufficient slippage for the wheels to obtain high adhesion. This method is a significant improvement on the earlier practice and considerably high adhesion levels have been achieved by using this approach. It has, however, several major disadvantages. These are:

(1) Since somewhat arbitrary creepage limits are used for limiting the power in the motors, the wheels end up operating in an adhesion creepage domain which is often unstable, resulting in both mechanical and electrical instabilities in the system. This will be more clear in later discussions. Therefore, all elements or members of the drive or power train starting from the wheels all the way up to the engine including the electrical power plant have to sustain sudden changes and shock loading. This can lead to early failure of the weaker links in the drive chain.

(2) The adhesion levels achieved in this method are quite high but not in the optimum region on a continuous basis. In other words, improvements in adhesion levels are still possible.

(3) Creepages larger than necessary lead to wasted energy and fuel consumption. They also produce higher wheel and rail wear than is necessary for producing the operating adhesion levels.

(4) There is one other problem with the present control systems. They resort to application of sand between the wheel and the rail when insufficient adhesion is being produced. There is no indication of the need for sand application given considerably in advance. Such indication, if it were available, could enable a rail cleaning system such as in U.S. Pat. No. 4,781,121 to start operating and cleaning the rail. This would allow sand application to be avoided in most instances, which is desirable because sand increases wheel/rail wear by ten to one hundred times (see Kumar, S., Krishnamoorthy, P.K. and Prasanna Rao, D.L., "Wheel-Rail Wear and Adhesion With and Without Sand for a North American Locomotive", A.S.M.E. Journal of Engineering for Industry, May 1986, Vol. 108, pp. 141–147).

The present invention overcomes all the above four difficulties. It helps to operate the locomotive wheels in the stable adhesion/creepage domain. It permits increase of power/generator excitation and wheel creep only up to certain maximum values which depend on the wheel/rail contact characteristics and by which the fuel consumption is kept low as well as the wheel/rail wear is kept low. It achieves nearly optimum levels of adhesion on a continuous basis. It achieves a clear signal in advance that rail cleaning is needed and activates the cleaning system for increased adhesion levels. It also activates sand application when creep exceeds a certain specified high value and shuts it off when it is not needed. These factors will become more clear in the later discussion with the use of figures.

SUMMARY OF THE INVENTION

This invention relates to a new method of controlling locomotive wheel slip for achieving nearly optimum adhesion that can be achieved under the prevailing wheel/rail surface/environmental conditions while keeping down wheel/rail wear and associated wasted energy. It reduces the shock loading and resulting damage to the electro-mechanical drive train of the locomotive to a minimum, and thus enhances the life of the drive train components significantly. It achieves the above by keeping the locomotive wheel rail contact characteristics stable all the time; hence the name "Stable Advanced Adhesion System" abbreviated as SAAS in later discussion. This invention is intended to be used on electric locomotives which are either powered by an on board generator or by wayside electrical power.

A method and apparatus are disclosed for controlling a locomotive wheel slip for achieving nearly optimum adhesion continually when demanded, while keeping down the levels of: wheel rail wear, energy wasted in excessive wheel slip, and the shock loadings and resulting damage to the electro-mechanical drive train of the locomotive. The basis of the invention for high adhesion demand control of a locomotive is to always maintain a small but positive value of the slope of the wheel-rail adhesion creep curve (or differential of adhesion versus creep) for all traction axles of a locomotive through microprocessor control.

One way of achieving this is to maintain a positive small value of the differential of the electric current with respect to rpm for all series traction motors of a locomotive. It requires continuous sampling of the motor speeds, currents and voltages and uses the back emf per rpm versus motor current characteristics of the series traction motors connected in parallel, to compute certain defined functions of current I and $\partial I/\partial n$, e.g. $B/n)(\partial I/\partial n)$ where n is motor rpm and $\beta$ is a constant. If the value of this function is below a certain level for defined values of I, the microprocessor sends a signal to activate rail cleaning and deactivates it when the value of the function has reached beyond another specified value. The value of this function by itself or in conjunction with another function of I, $\partial I/\partial n$, e.g. $(1+(\partial I/\partial n)^2)^{\frac{1}{2}} dn$ is used to define an operating window for the control and operation of motors continually in the optimum domain when high adhesion is demanded. If the rail is so dirty that rail cleaning does not clean it enough (or rail cleaning is not available) and creep develops above a specified value, sand application is turned on while monitoring the control functions for correcting the generator excitation levels. This control brings the performance to a low-creep, stable domain and shuts off sanding when it is not needed. When, due to a sudden increase in rail contamination, the value of the control function becomes negative, the microprocessor control reduces the generator excitation in stages until the function becomes positive and inside the operating window again. Thus operation in the optimum adhesion window is achieved under all rail conditions.

BRIEF DESCRIPTION OF THE DRAWINGS

FIG. 3 shows the adhesion-creepage and motor current-rotational speed relationship for Differential Creepage Control SAAS.

FIG. 12 gives the system status description used in the SAAS flow chart shown in FIGS. 10 and 11.

DETAILED DESCRIPTION OF THE INVENTION

Figure 2:
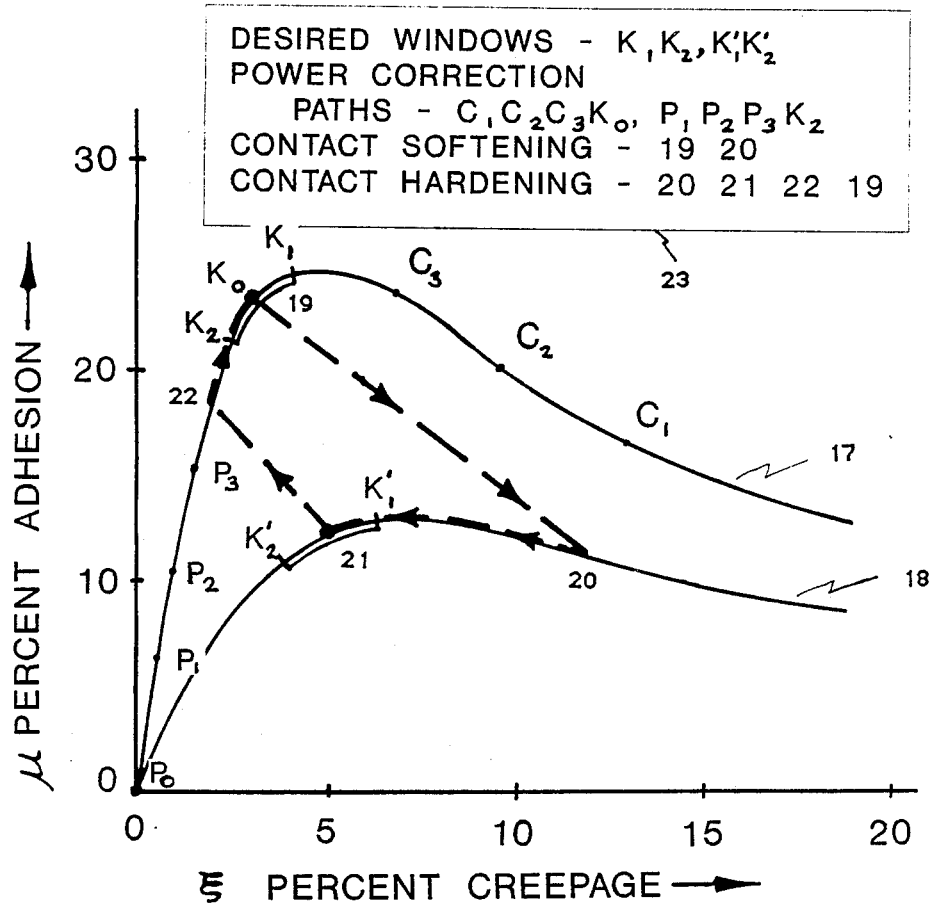
FIG. 2 shows a method of locomotive control from one adhesion/creepage curve to another as rail surface conditions change.
Figure 9:
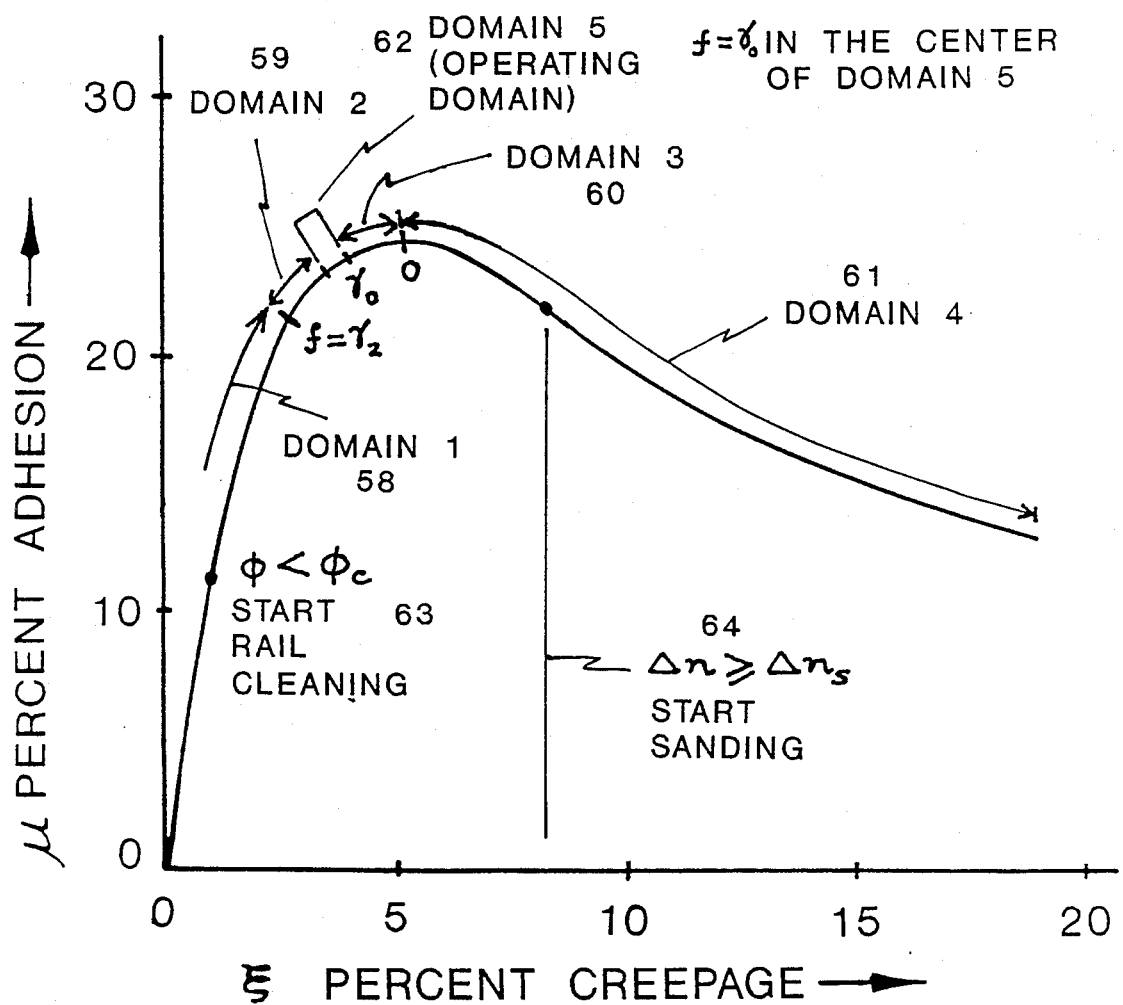
FIG. 9 shows the five domains of adhesion creepage for locomotive control with SAAS. It also shows the start-up of rail cleaning and sanding.
Figure 10:
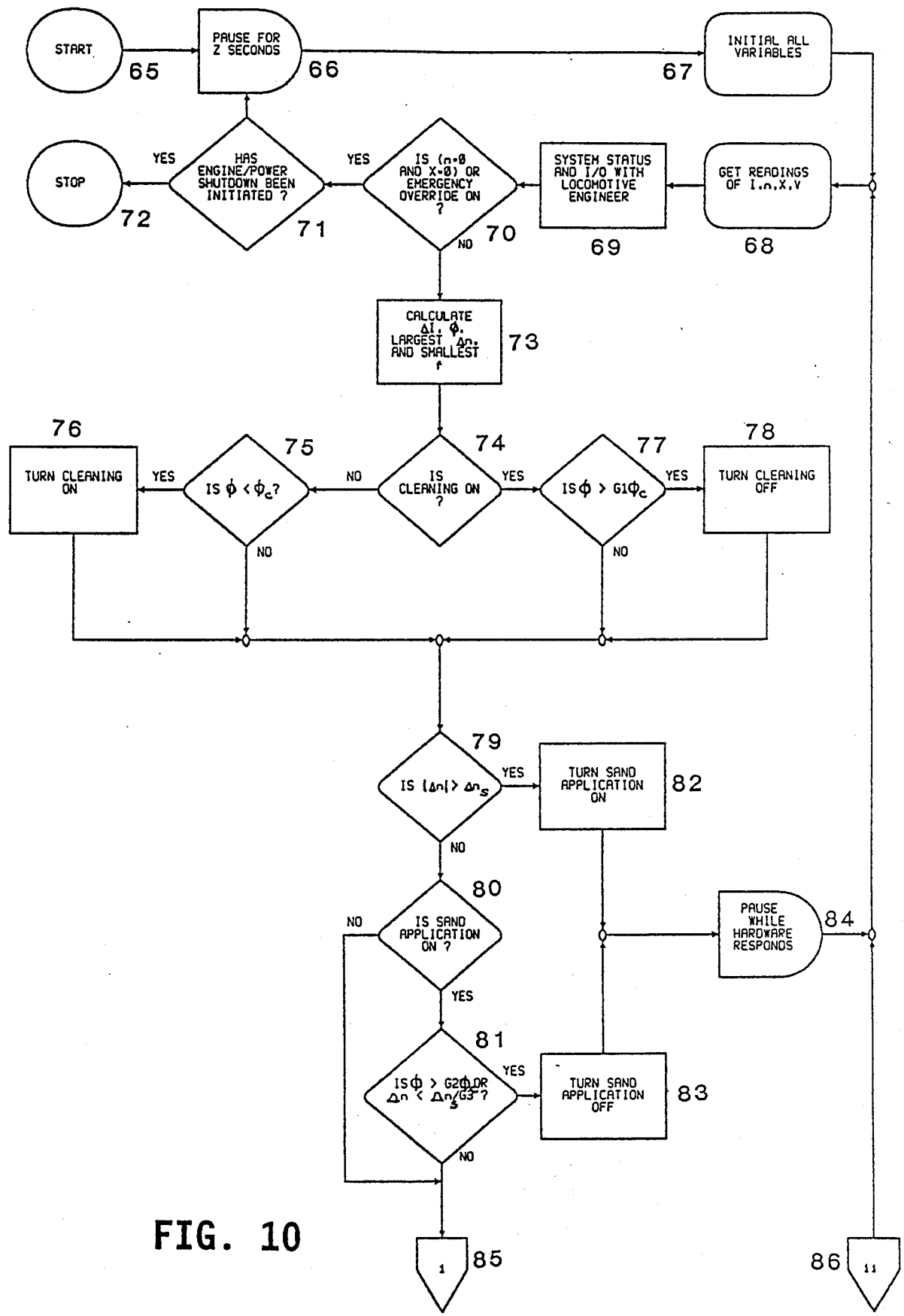
FIGS. 10 and 11 are a computer flow chart showing the basis of microprocessor implementation of differential creepage control.
Figure 11:
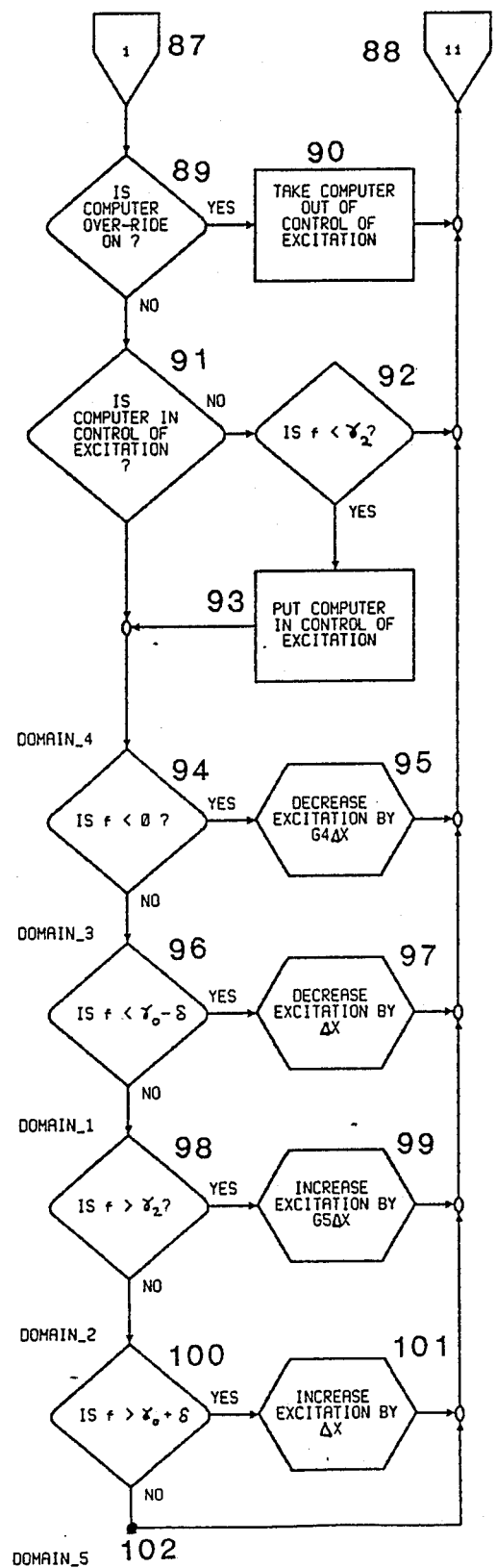

Key To Symbols Used In The Following Description:

- $\mu$—Percent adhesion coefficient
- $\xi$—Percent creepage
- t—Time
- I—Motor Current
- $\Delta J$—Increment of motor current
- V—Motor Voltage
- E—emf
- X—Generator Excitation
- R—Resistance
- $R_W$—Wheel diameter gear ratio related constant
- $V_2$—Train speed
- n—Motor speed (rpm)
- $\Delta n$—Increase in motor speed corresponding to $\Delta I$ increment in motor current at a given speed
- $\Delta n_s$—Value of $\Delta n$ at which sanding starts
- f—Excitation control function (function of dI/dn)
- $\beta$—A constant used in function f
- $\Phi$—Rail cleaning control dI/dn function
- $\Phi_C$—Value of $\Phi$ at which rail cleaning starts
- $\gamma_2$—Value of function f at the lower edge $K_2$ (FIG. 2) of adhesion window
- $\gamma_o$—Value of function f in the high adhesion operating domain 5 (FIG. 9) and $K_o$ in FIG. 2
- $\delta$—Variation of $\gamma$ acceptable for steady operation domain 5 (FIG. 9)
- $\alpha_1, \alpha_2$—Constants used in control functions
- G1—Start rail cleaning constant
- G2—Rail cleanliness constant for stopping sanding
- G3—Motor speed creep reduction constant
- G4—Large step excitation reduction constant for unstable negative slope region, domain 4 (FIG. 9)
- G5—Large step excitation increase constant for stable positive slope region, domain 1 (FIG. 9)
- Z—Number of seconds for computer control pause
- i—Algorithm control flow connector from FIG. 10 to FIG. 11
- ii—Algorithm control flow connector from FIG. 11 to FIG. 10.

Figure 1:
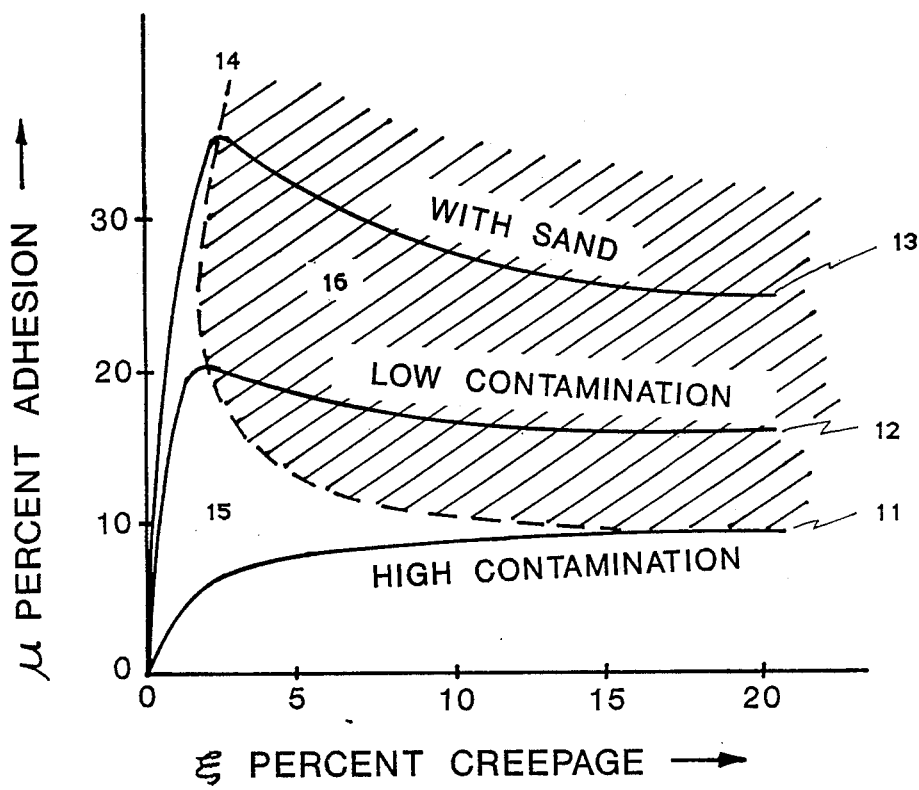
FIG. 1 shows typical adhesion/creepage characteristics of a locomotive on a rail with different surface conditions.

Based on extensive field tests of locomotives (see Logston, C.F. and Itami, G.S., "Locomotive Friction-Creep Studies", A.S.M.E. Joint Railroad Conference, Montreal April 1980), FIG. 1 shows a qualitative plot of locomotive percentage adhesion versus percentage creepage for three conditions of rail surface. These are: high contamination 11, low contamination 12, and with sand application 13. The peaks of these curves have been joined by a dashed line 14 which separates the adhesion creepage space into two regions: a clear area 15, and a shaded area 16. It is an objective of the present invention to operate the locomotive in the clear region 15. The shaded region 16 is not considered to be good to operate in, as it is a region of mechanical and electrical instability in which the power train components starting from the wheels, all the way up to the engine and electrical power plant have to sustain sudden changes and shock loadings. This can lead to early failure of the weaker links in the chain. Large unstable creepages associated with region 16 can lead to torsional oscillation of wheel sets, wasted fuel and higher wheel/rail wear. Moreover, the adhesion levels achieved in region 16 are obviously not the maximum. The desired region of locomotive performance is to the left of the dashed curve 14, with the optimum being very near the peak of the operating adhesion creepage curve. The dashed curve 14 is a locus of all such peaks. When high adhesion is demanded of the locomotive, its adhesion/creepage characteristics can approach the dashed boundary but should not be allowed to cross it. However, if sometime due to sudden changes in the rail surface conditions the dashed boundary is suddenly crossed, a further objective of this invention is that the controls should adjust the power in such a way that the characteristics return as fast as possible to the region 15.

It is a further objective of this invention that when high adhesion is demanded the locomotive operates at adhesion levels slightly below the peak and to the left of dashed line 14. The new control system of the present invention called "Differential Creepage Control System for Locomotives - A Stable Advanced Adhesion System" is based on the premise that the first differential of adhesion coefficient with respect to creepage will stay positive all the time and if it does become negative momentarily, the control system will adjust power so that it becomes positive again.

FIG. 2 shows how the above objective of operating in region 15 of FIG. 1 can be achieved. As the rail surface conditions change, the corresponding adhesion creepage curve on which the locomotive wheels are operating also changes. FIG. 2 shows two such curves 17 and 18. Curve 18 corresponds to a higher contamination level. For high adhesion applications the locomotive should operate in the an optimum range, defined herein as adhesion window $K_1K_2$, 19 on curve 17 and adhesion window $K_1'K_2'$, 21 on curve 18, these being the desired windows. The figure shows the method of locomotive control from one adhesion creepage curve window to another as the rail surface conditions change. Let us assume that as the train starts from a terminal the rail surface conditions correspond to adhesion creepage curve 17. The locomotive engineer increases the motor excitation level which corresponds to an adhesion level shown in FIG. 2 from $P_o$ to $P_1$. Assuming that high adhesion is demanded with correspondingly high level of locomotive power being available, either the locomotive engineer or a microprocessor-based control system continues to increase the excitation level to increase adhesion from $P_1$ to $P_2$, and from $P_2$ to $P_3$. The microprocessor continually checks values of suitable functions related to the differential of adhesion with respect to creepage. During this process if the value of this function falls below a certain specified value with respect to the current I, the microprocessor sends a signal to activate a rail cleaning system, such as that shown in U.S. Pat. No. 4,781,121 and available from Tranergy Corporation of Darien, Ill. under their trademark SENTRAEN I. The cleaning continues until the value of the adhesion creepage differential function remains below another specified value. It stops when the value of the control function exceeds certain specified limits. Levels of adhesion, creepage and its differential are continually monitored and once the adhesion levels are high enough (corresponding to lower end $K_2$ of the adhesion window $K_1K_2$), the microprocessor takes control of the generator excitation levels and increases it in small steps so that the value of the function reaches a value corresponding to $K_o$, the operating value of optimum adhesion, and maintains it within the window $K_1K_2$ for steady operation.

There can be a situation when due to sudden degradation of the rail surface condition the locomotive may momentarily operate at an excitation level $C_1$ corresponding to adhesion creepage at point $C_1$ shown in FIG. 2. As soon as the microprocessor checks and determines that the differential of adhesion versus creepage or the value of a selected corresponding function at that excitation level is negative, it will reduce the excitation power levels in steps to corresponding values for $C_1$ to $C_2$ to $C_3$ and finally land in the adhesion window $K_1K_2$ at $K_o$ 19 as determined by the specified function. FIG. 2 further illustrates the concept of locomotive wheel rail contact softening with the dashed line 19, 20. If the locomotive were operating at excitation levels corresponding to the window $K_1K_2$ and suddenly the rail condition deteriorated, the wheel rail contact will suddenly soften and perform at level 20. The microprocessor on checking a specified function corresponding to adhesion creepage differential finds that it is negative and implements immediate correction of excitation levels so that the locomotive wheel performance changes from 20 towards 21 and finding the specified adhesion creepage differential function to be at the specified positive value of the function, it computes the location of the new desired adhesion window $K_1'K_2'$ and holds the excitation levels to dwell within that range.

FIG. 2 also shows how a locomotive control will change when its wheels suddenly encounter a much cleaner rail corresponding to adhesion creepage curve 17. At the existing excitation levels corresponding to adhesion window $K_1'K_2'$ and with the change in rail surface conditions, the wheel performance moves to level 22 on curve 17. The microprocessor, upon checking that the adhesion creepage differential function is not at the specified optimum value, increases the excitation level to make the adhesion reach level $K_o$ and controls power for operation within the adhesion window $K_1K_2$. The terms used in the description here are listed in the legend box 23. With this differential creepage control system, the locomotive will operate in the desired adhesion windows nearly all the time (except the unavoidable short durations in which its performance jumps into the undesirable region 16 of FIG. 1 and is immediately corrected).

It is somewhat expensive and difficult to measure on a continuous basis the differential of adhesion with respect to creepage for all the driven axles of a locomotive. The present invention therefore incorporates a new method of measuring and controlling the differential of adhesion versus creepage as shown in FIG. 3. The adhesion coefficient of a single axle is proportional to the torque of the motor driving that axle which in turn is proportional to the current I of that motor. This means that the rate of change of adhesion in time $\Delta\mu/\Delta t$ is proportional to the rate of change of current in time $\Delta I/\Delta t$, where I is the current and t is the time (Eqn. 1). The creepage of the wheels $\xi$ is equal to $(nR_W-V_2)/V_2$, (Eqn. 2), where $R_W$ is a wheel diameter and gear ratio related constant, $V_2$ is train speed and n is motor rpm. Differentiating Eqn. 2 for a small time increment $\Delta t$ and neglecting second order terms, we can write Eqn. 3, indicating that the rate of change of creepage with time $\Delta\xi/\Delta t$ is proportional to the rate of change of motor rpm $\Delta n/\Delta t$. This assumes that the train acceleration is not large, i.e. $dV_2/dt$ is nearly zero. For most high adhesion demand applications this condition is satisfied. Equation 3 has another important implication. Increment of creep is proportional to increment of motor speed for a given train speed and for a small period of time and small accelerations. This proportionality will be used later for estimating creep conditions for sanding. Dividing Eqn. 1 by Eqn. 3, we see that the differential of adhesion with respect to creepage $\partial\mu/\partial\xi$ is proportional to the differential of motor current with respect to motor rpm $\partial I/\partial n$. In other words, we conclude that $\Delta I/\Delta n$ can be used for controlling $\Delta\mu/\Delta\xi$ for each individual axle. It should be pointed out here that locomotive control based on a $\partial I/\partial n$ function does not require measurement of wheel diameter as it is changing with wear. Such measurements and calibration are necessary for some presently used motor rpm based control systems.

Figure 4:
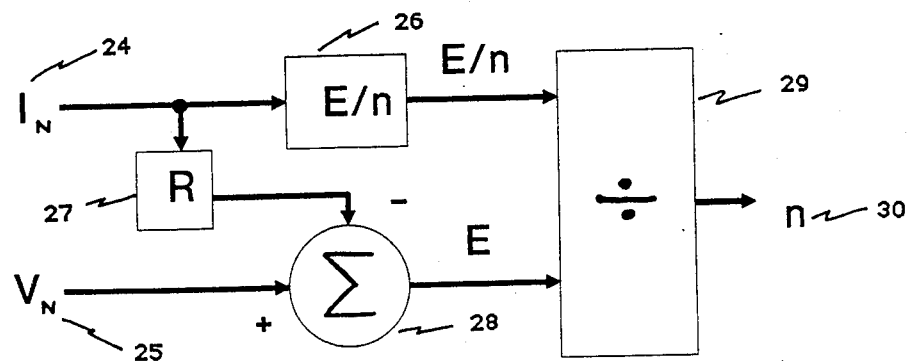
FIG. 4 shows a method to compute the motor rpm n.
Figure 5:
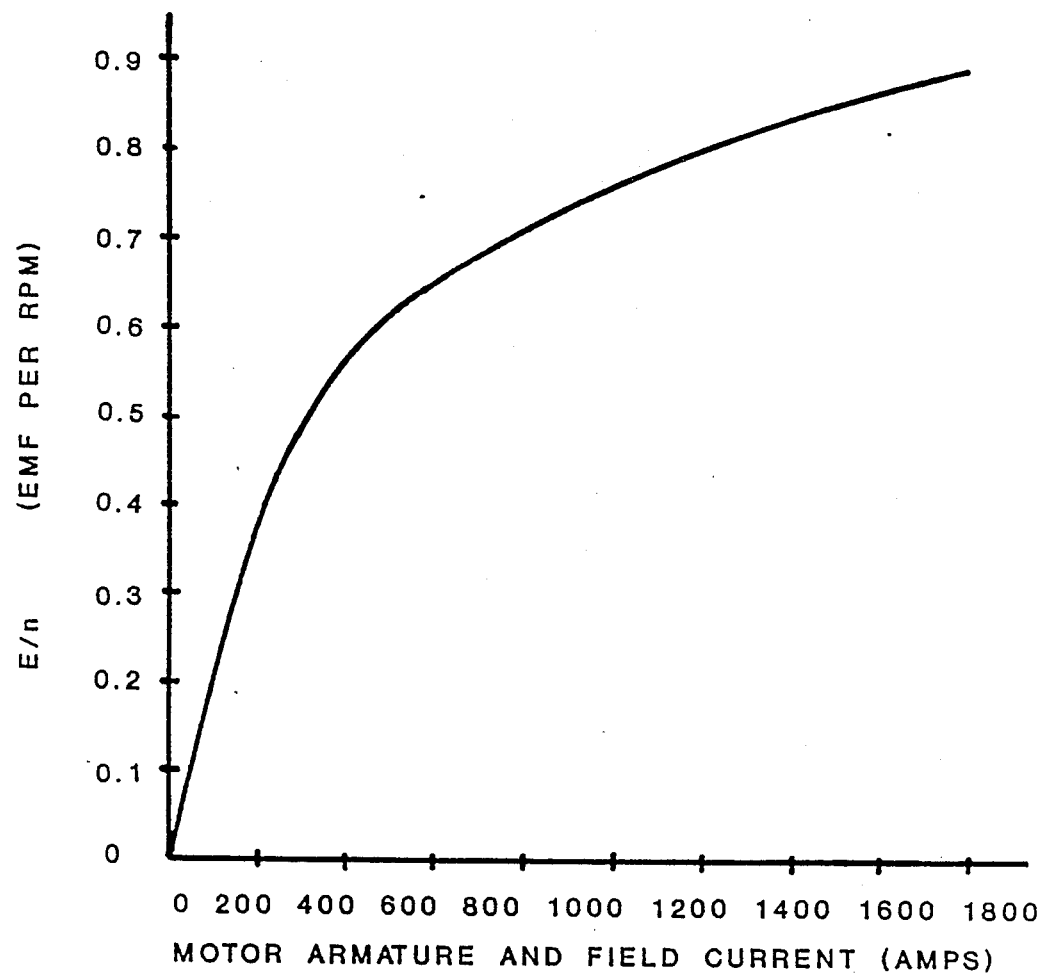
FIG. 5 depicts a typical back emf per rpm versus motor current curve for a series wound motor.

FIG. 4 shows a method to compute the motor rpm n. This method may be used if it is not desired to actually measure the motor rpm with the motor speed transducers. It is considered preferable to make actual motor speed measurement rather than compute the motor rpm. However, if great accuracy of control is not desired, the method of computation will prove less expensive and therefore economically more desirable. FIG. 4 shows that the input values of current and voltage $I_N$ 24 and $V_N$ 25 for a particular motor N when combined with the stored information of the motor characteristics of back emf per rpm, E/n, versus motor armature and field current I shown in FIG. 5 will yield the intermediate values of E/n and E. These values are derived by using the back emf or E developed from the E/n curve and basic motor equation $V=E+IR+V_b$, where V is the total motor voltage, R is the total motor resistance, and $V_b$ is the brush drop. (The value of $V_b$ is very small and therefore it may be ignored in the computation). Using this equation and the measured value of $I_N$ 24, and the resistance of the motor 27 and utilizing the summer 28, the value of the back emf E is obtained. Dividing the value of E by E/n 29 yields the value of n 30. Knowing the values of $I_N$ the motor current and the motor rpm n, the value of ($\partial I/\partial n$) can be computed.

Thus, motor current and motor rpm can be chosen as first and second parameters such that the differential of the first with respect to the second is proportional to the differential of adhesion with respect to creepage. It will be understood that alternatively the adhesion and creepage could be chosen as the first and second parameters. These quantities could be measured directly and the differential used to control the generator excitation as explained above.

Figure 6:
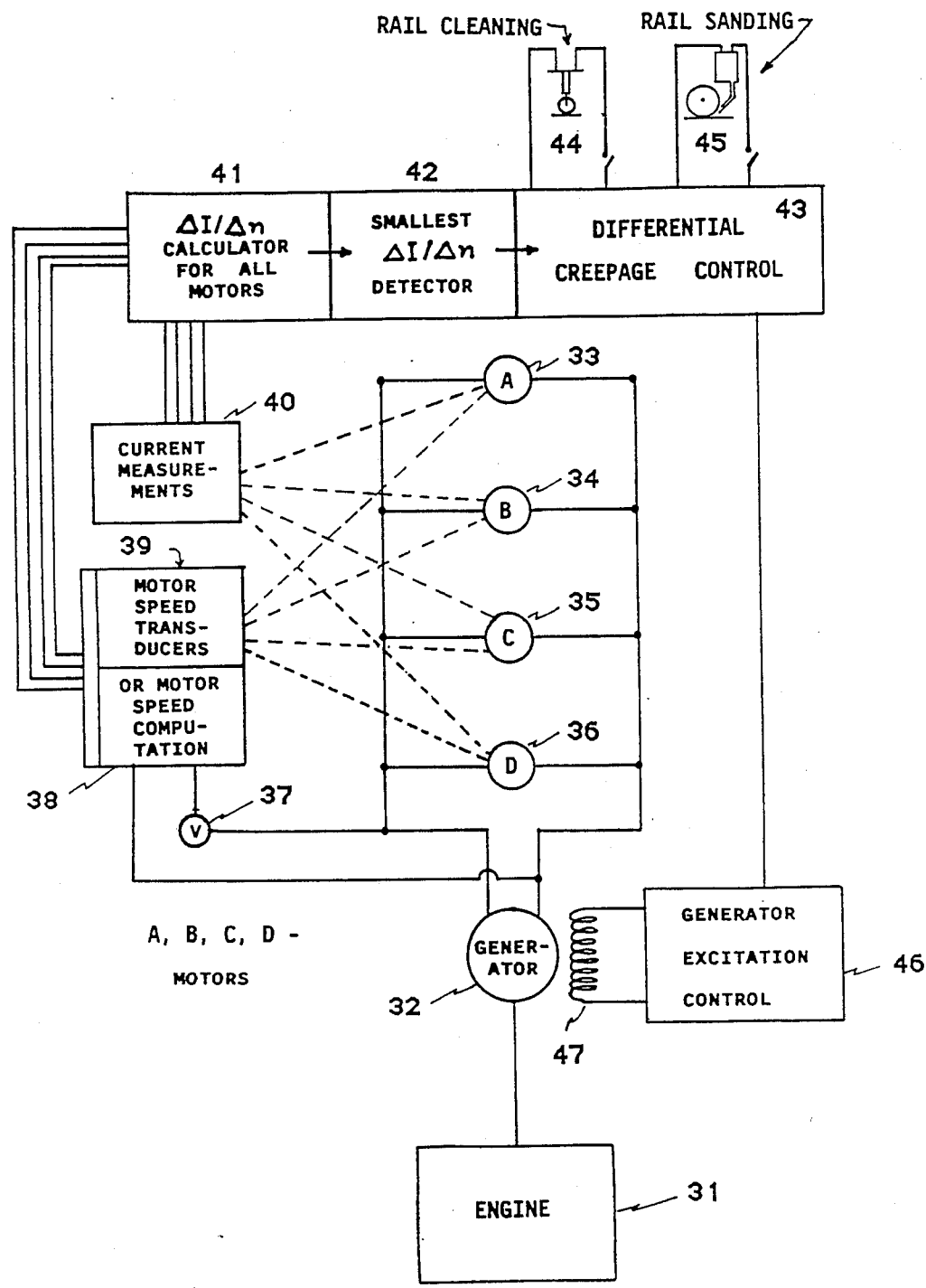
FIG. 6 is a block diagram of control for a locomotive including the new differential creepage control according to the invention.

FIG. 6 shows a block diagram of control for a locomotive including a Differential Creepage Control System (SAAS) according to the present invention. A diesel engine 31 drives the generator 32 which has a field 47 supplied by conventional generator excitation control 46 which nominally effects a constant horsepower output of the generator 32. Four (or more) series wound motors A 33, B 34, C 35, and D 36 are connected in parallel across the generator with each motor driving an axle of the locomotive. There are two sets of transducers on each motor. One set measures the motor speeds 39 and the other set measures the motor currents 40. If great accuracy of control is not desired or not necessary, the motor speeds may be computed as shown in FIG. 4. For doing this, value of the voltage input V to the four motors is obtained through 37. The current measurements and motor speeds (measured or computed) are used through step 41 to calculate $\Delta I/\Delta n$ for all motors 43. The smallest value of $\Delta I/\Delta n$ is identified 42 by the microprocessor, which then uses this value for locomotive control through the differential creepage control 43. SAAS performs the following control functions:

(i) When the power is being increased under manual control, it checks whether the rail requires cleaning. If it does, it turns the rail cleaning 44 on. This is done by comparing a specified $dI/dn$ function $\Phi$ with I. If and when the value of this function exceeds a certain value with respect to I, it shuts off rail cleaning.

(ii) As the power is being increased further while high adhesion is demanded from the locomotive, and the value of another specified $dI/dn$ function f equals a certain specified value corresponding to the lower end $K_2$ of the adhesion window (FIG. 2), the computer is given control of generator excitation. The computer maintains this control until the locomotive engineer manually reduces power/excitation, or applies brakes or goes on manual override.

(iii) Once the operation is in the adhesion window the computer adjusts excitation levels to maintain operation at the optimum adhesion level corresponding to $K_o$ in FIG. 2.

(iv) If at any time the largest of the wheel creep levels measured by $\Delta n$ exceeds a specified value $\Delta n_s$ (a value corresponding to specified creep levels such as 6–8%), sand application 45 is activated by the computer. Sand application continues until either n drops below a specified fraction of $n_s$ or the function $\Phi$ exceeds a certain specified value, discussed later.

(v) If at any time dirty rail is suddenly encountered and the $dI/dn$ function f becomes negative, the computer reduces the generator excitation levels in large steps until the value of f corresponds to adhesion level $K_o$ (FIG. 2).

(vi) If at another time clean rail is encountered and f becomes smaller than the specified value for $K_o$ (FIG. 2), the computer increases power/excitation in steps until the function f reaches the value for $K_o$.

Figure 7:
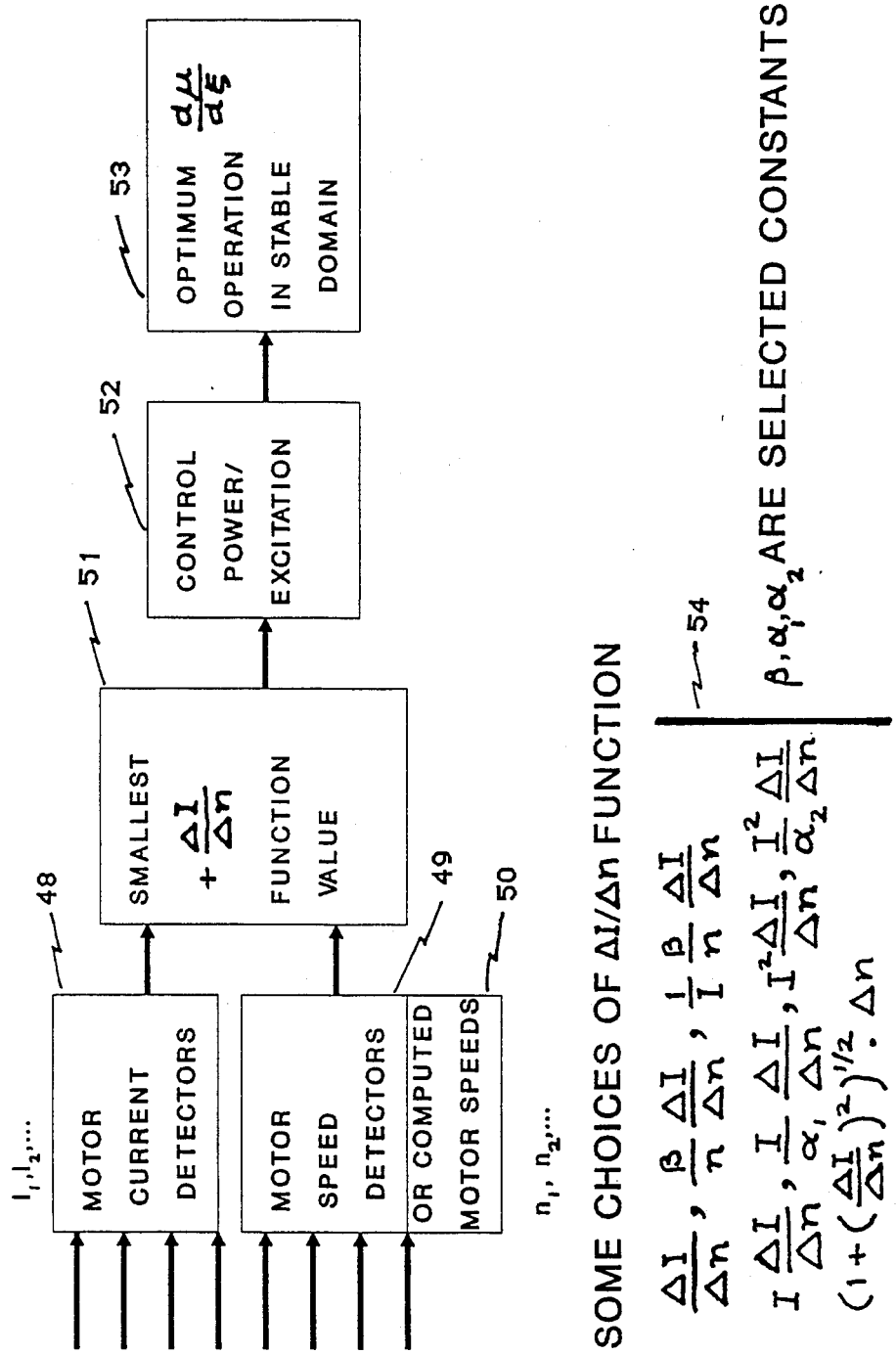
FIG. 7 is a brief description of the Differential Creepage Control SAAS.

FIG. 7 shows the description of SAAS. The microprocessor receives the input of the motor currents and the motor speed 48 and 49. If, however, the motor speeds are not measured, the motor speeds are computed 50. Based on the readings of motor current and motor speeds, values of a selected $\Delta I/\Delta n$ function are calculated 51. The computer analyzes the values of the smallest $\Delta I/\Delta n$ according to an algorithm discussed later and provides control of power 52 through the motor excitation control. This insures that the locomotive operation is in the optimum $\partial\mu/\partial\xi$ domain 53. Two suitable $\Delta I/\Delta n$ functions f and $\Phi$ (discussed earlier) are selected for the microprocessor control of the locomotive. Several choices 54 are shown in FIG. 7 as examples. The preferred function f is $\beta/n \cdot \Delta I/\Delta n$. The preferred function $\Phi$ is either the same as function f or $\alpha I/n^2 \cdot \Delta I/\Delta n$. Many other functions can be considered for this purpose.

Figure 8:
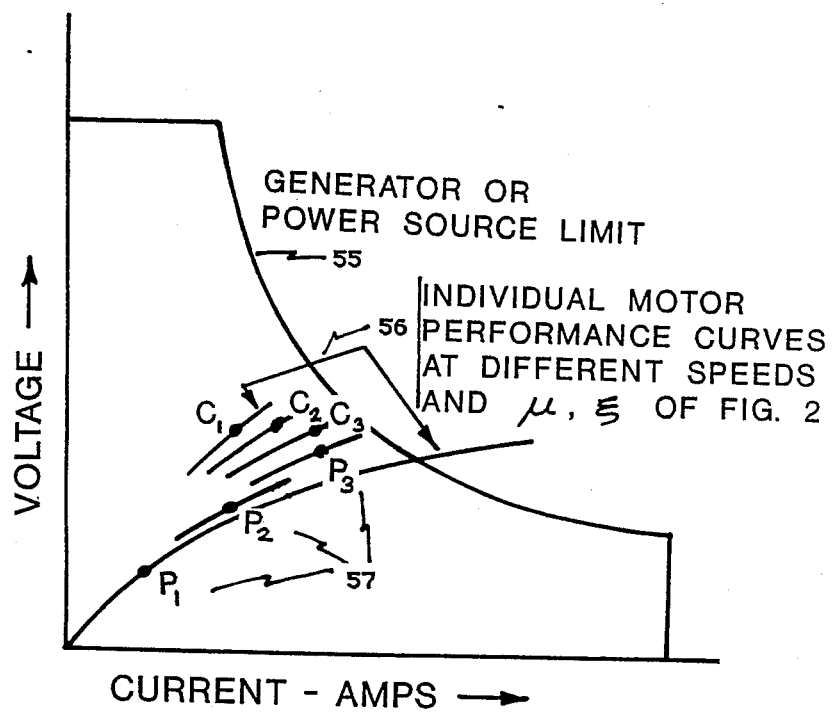
FIG. 8 shows a voltage/amperage plot of typical motor power changes within the generator power bounds.

FIG. 8 shows a typical plot 55 of a DC generator power showing how current in amperes changes with voltage for a given level of power being produced by the generator. Qualitative individual motor performance curves 56 at different speeds and values of adhesion creepage are also shown superposed on this plot in FIG. 8. Comparing with FIG. 2 the adhesion creepage levels $P_1$, $P_2$, $P_3$, $C_3$, $C_2$, $C_1$ fall on different curves 57 of a motor as shown in FIG. 8. All these levels of adhesion creepage are achievable as long as all the points $P_1$, $P_2$, $P_3$, $C_3$, $C_2$, $C_1$ fall within the bound of power 55 generated. If any of the points fall outside the bound, the corresponding value of adhesion creepage will not be reachable unless the generator power is increased. In other words, the final controlling parameters are the excitation level of the generator and the power output capacity of the engine.

FIG. 9 shows an adhesion creepage curve for locomotive performance. There are five domains shown in the curve. Domain_1, 58 extends from zero adhesion level to the lower end of the adhesion window ($K_2$ in FIG. 2). The value of the control function f at this juncture is $\gamma_2$. Domain_2, 59, domain_3, 60 and domain_5, 62 are all in the adhesion window. The operating domain is intended to be in the center of the adhesion window and is shown as domain_5, 62. Domain_2, 59 is below domain_5, 62 and domain_3, 60 is above domain_5, 62. The value of the control function f in the center of domain_5, 62, is $\gamma_o$. The unstable and undesirable region of wheel operation is domain_4 61.

FIG. 9 also shows two other features of SAAS. When the locomotive is performing in domain_1 and if the value of the rail cleaning control function $\Phi$ is smaller than a specified value $\Phi_c$ the rail cleaning is initiated by the control system 63. If excessive slip develops and large values of $\Delta n$ (greater-than or equal-to $\Delta n_S$ a specified value) are recorded 64, the SAAS activates sand application to the rail while simultaneously reducing excitation levels so that the wheel performance returns to the adhesion window. High creep levels are indicative of dirty rail as well as wastage of energy which should be avoided. The parameters described in FIG. 9 are used later for development of the computer control algorithm of SAAS.

FIGS. 10 and 11 show a computer control algorithm for the implementation of SAAS. This program is continually in operation when the engine/power is on. It monitors the locomotive performance parameters continually. When the train is started, it is operated under the normal control of the locomotive engineer by the presently used operational practices. The program keeps monitoring several control parameters, as the train is accelerating, to determine if and when high adhesion demand is being made from the wheel rail contact. When the performance reaches end of domain_1 FIG. 9, which is the same location as the lower point of the adhesion window ($K_2$ in FIG. 2), the computer takes control of the locomotive through the algorithm of SAAS. It should be noted that the rail cleaning and sanding are controlled even when the computer is not in control of the locomotive, except during enforcement of emergency override.

The algorithm incorporates two loops, a primary and a secondary loop. The primary loop does all calculations of and maintains control for optimum generator excitation levels. It also determines the need to start or stop rail cleaning and/or sanding. The secondary loop 66 through 71 checks if the train is moving and whether the excitation has increased above zero base to determine when to enter the primary loop. It also turns off the program when engine power is off.

The algorithm starts 65 and after a brief pause of Z seconds 66, all the needed constants are read 67 from the data files. These include G1, G2, G3, G4, G5, $\beta$, $\gamma_o$, $\gamma_2$, $\delta$, $\Delta n_s$, R, $R_W$, $\alpha_1$, and $\alpha_2$. Readings are also taken of all the variables needed to make calculations 67. These variables include E/n versus I and $\Phi_c$ versus I. Readings are then taken 68 of the operating parameters I, n, X, and V. System status and input/output communication with the locomotive engineer is then provided 69. The train movement is monitored 70 with checking of n=0 and X=0. Before entering the primary loop, it also checks 70 whether the emergency override is on. If the answer is Yes, then computer control continues waiting for the train to start moving (or excitation to increase) in the secondary loop from 66 to 71. The program is stopped if engine/power is shut down at anytime. If the answer to 70 is No, control moves along the path of the primary loop to 73.

At this point the motor rpm n is calculated or measured for all motors; largest $\Delta n$ for specified $\Delta I$ is identified and the smallest value of the function f determined. Function $\Phi$ is also calculated. Stages 74 through 78 check if rail cleaning is necessary, whether the cleaning is not already on 74 and when $\Phi < \Phi_c$, 75, then cleaning is turned on 76. When cleaning is already on 77 and $\Phi$ is greater than G1 times $\Phi_c$, 77, then the cleaning system is deactivated. If both of the above two conditions are false, then control drops through to 79.

Next the possible need for sanding is addressed. If corresponding to a defined $\Delta I$ increment, $|\Delta n|$ is greater than a predefined constant $\Delta n_s$, 79, the creep is unacceptably high and sanding is initiated 82. If sand application is not on 80, the computer control drops to the algorithm control connector 85. If function is greater than G2 times $\Phi_c$, 81 and/or $\Delta n$ is smaller than $\Delta n_s/G3$, then sand application is turned off 83. A computer algorithm pause is initiated 84 after sand application is turned on 82 or off 83 to allow the hardware time to respond to the computer command in order for the next set of readings 68 to reflect this change in the locomotive data. The algorithm continues from FIG. 10 to FIG. 11 through page connectors 85 to 87 and 86 to 88.

Computer override is enforced when the locomotive engineer reduces excitation, starts braking, or demands control from the computer for emergency override. Under normal control operation the engineer cannot take control from the computer to increase power when the algorithm is functional. Such power/excitation will be increased in a controlled way by the computer algorithm only. The locomotive engineer can assume control only through emergency override included in the input/output statement 69. If the computer override is on 89, the computer is taken out of control of excitation 90 and continues up to get a new set of readings 68. While computer override is on, it is not in control of excitation, but it still continues to monitor the parameters. If the computer is not in control of the excitation 91 and the control function f is less than the predefined constant 92, then the microprocessor is put in control of excitation 93. If f is not less than $\gamma_2$, then microprocessor control goes back to get a new set of readings 68.

At this point the computer algorithm enters the main sequence of SAAS 94 through 102. As shown in FIG. 9, there are five domains of the adhesion creep curve. Accordingly, there are five sequence control statements corresponding to each domain. Initially, the algorithm checks if the existing creep level is situated on the negative side of the creep curve. This is indicated if the control function f is less than zero 94. This corresponds to domain_4 of FIG. 9. In such a case the excitation is decreased, 95, by a large step given by G4*$\Delta X$, where G4 is a constant considerably larger than one. If f is less than $\gamma_o - \delta$, 96, then the excitation is decreased 97 by a small step $\Delta X$. This corresponds to domain_3 in FIG. 9. If f is greater than (domain_1), 98, excitation is increased, 99 in larger steps by G5* X, where G5 is a constant much larger than one. If $f > (\gamma_o + \delta)$, domain_2, 100, the excitation is increased by $\Delta X$, 101. If none of the above four conditions 94, 96, 98 and 100 are true, then positioning of the locomotive performance in the middle of the window has been achieved and the microprocessor control does not change excitation and goes back to get the next set of readings 68. The operation at this point is in domain_5 of FIG. 9, 102.

The above algorithm thus achieves rail cleaning when needed, sand application when excessive creep develops, computer override, and operation in the optimum adhesion zone by proper control of excitation of generator.

FIG. 12 gives a description of the system status. It gives an output to the engineer as to who has control of the locomotive: SAAS or the locomotive engineer. It gives the status of the emergency override of the computer: on or off. It gives the status of the brake system: on or off. It also gives the conditions of computer override being on or off. It gives the cleaning override system status: on or off, and the sanding override status: on or off. And finally, it gives a system check status as to whether everything is O.K. or if there is any malfunction.

The preferred adhesion window shown in FIG. 9 is defined as follows. The upper limit of domain_3 is where the differential of adhesion with respect to creepage is zero. At the center of domain_5, the differential of adhesion with respect to creepage is about 0.63. At the lower limit of domain_2, the differential of adhesion with respect to creepage is about 1.0 to about 1.5, depending on how tightly the manufacturer wishes to control the locomotive.

It will be understood that the adhesion window could vary from that just described. For example, instead of strictly limiting the function f to positive values, it could be controlled such that small negative values would be permitted. In other words, the adhesion window could extend somewhat beyond the peak of the adhesion-creepage curve.

Whereas a preferred form of the invention has been shown and described, it will be understood that alterations or modifications could be made thereto without departing from the scope of the following claims.

We claim:

1. A method of controlling power applied to a locomotive drive train, comprising steps of:
   (a) measuring first and second parameters of locomotive operation, said parameters being chosen such that differential of the first with respect to the second is uniquely related to differential of adhesion with respect to creepage;
   (b) calculating a representation of the differential of adhesion with respect to creepage, utilizing the first and second parameters; and
   (c) adjusting the power applied to the locomotive drive train in response to said calculated representation such that the differential of adhesion with respect to creepage is within an optimum range defined as an adhesion window and wherein the adhesion window is defined such that within the window the differential of adhesion with respect to creepage is greater than zero.

2. The method of claim 1 wherein the first parameter is adhesion and the second parameter is creepage.

3. The method of claim 2 wherein the adhesion window is defined such that at its center the value of the differential of adhesion with respect to creepage is about 0.63.

4. The method of claim 2 wherein the adhesion window is defined such that at its lower limit the value of the differential of adhesion with respect to creepage is about 1.0 to about 1.5.

5. The method of claim 2 wherein the magnitude and direction of the adjustment made in step (c) is dependent on the magnitude and direction of the deviation of the representation from the adhesion window.

6. The method of claim 1 wherein the magnitude and direction of the adjustment made in step (c) is dependent on the magnitude and direction of the deviation of the representation from the adhesion window.

7. The method of claim 1 wherein the adhesion window is defined such that at its center the value of the differential of adhesion with respect to creepage is about 0.63.

8. The method of claim 1 wherein the adhesion window is defined such that at its lower limit the value of the differential of adhesion with respect to creepage is about 1.0 to about 1.5.

9. The method of claim 1 wherein the adhesion window is defined such that at its lower limit the value of the differential of adhesion with respect to creepage is about 1.0 to about 1.5 and at its upper limit the value of the differential of adhesion with respect to creepage is near and greater than zero.

10. The method of claim 1 wherein there is further defined in the adhesion window an operating domain having a value of the differential of adhesion with respect to creepage of about 0.63 at its center and the power applied to the locomotive drive train is adjusted such that the differential of adhesion with respect to creepage is within the operating domain.

11. The method of claim 10 wherein the step of adjusting the power applied to the locomotive drive train is characterized by applying a first correction factor to the power when the calculated representation of the differential of adhesion with respect to creepage is outside the adhesion window and applying a second, smaller correction factor to the power when the calculated representation of the differential of adhesion with respect to creepage is within the adhesion window but outside the operating domain.

12. The method of claim 1 further characterized in that the locomotive is of a diesel-electric type and the adjustment made in step (c) is effected by altering an excitation level of the locomotive's generator.

13. The method of claim 1 further characterized in that the locomotive includes a rail cleaning device mounted thereon forwardly of the locomotive drive wheels, and the method further comprises steps of calculating a predetermined function of the adhesion-creepage curve and controlling operation of the rail cleaning device in response to the value of said predetermined function.

14. The method of claim 1 further characterized in that the locomotive includes a sand applicator and the method further comprises steps of calculating a value representative of the current wheel creepage and activating the sand applicator when the calculated value of creepage exceeds a predetermined limit.

15. The method of claim 14 wherein the predetermined limit is about 8% creepage.

16. A control system for controlling power applied to a locomotive drive train, comprising:
   (a) means for measuring first and second parameters of locomotive operation, said parameters being chosen such that differential of the first with respect to the second is uniquely related to differential of adhesion with respect to creepage;
   (b) means for calculating a representation of the differential of adhesion with respect to creepage, utilizing the first and second parameters; and
   (c) means for adjusting the power applied to the locomotive drive train in response to said calculated representation such that the differential of adhesion with respect to creepage is within an optimum range defined as an adhesion window and wherein the adhesion window is defined such that within the window the differential of adhesion with respect to creepage is greater than zero.

17. The apparatus of claim 16 wherein the first parameter is adhesion and the second parameter is creepage.

18. The apparatus of claim 16 further characterized in that the locomotive is of a diesel-electric type and the means for adjusting the power applied to the drive train is a generator excitation controller for governing an excitation level of the locomotive's generator.

19. The apparatus of claim 16 further comprising a rail cleaning device mounted on the locomotive forwardly of the locomotive drive wheels, and means for calculating a predetermined function of the adhesion-creepage curve and controlling operation of the rail cleaning device in response to the value of said predetermined function.

20. The apparatus of claim 16 further comprising a sand applicator mounted on the locomotive, and means for calculating a value representative of the current wheel creepage and activating the sand applicator when the calculated value of creepage exceeds a predetermined limit.

21. The apparatus of claim 20 wherein the predetermined limit is about 8% creepage.

22. A method of controlling the operation of a locomotive of a diesel-electric type and including, a rail cleaning device and a sand applicator, comprising the steps of:
- (a)d initializing in a microprocessor a set of data defining an adhesion window as the optimum range of locomotive operation on an adhesion-creepage curve, the adhesion window being defined such that within the window the differential of adhesion with respect to creepage is greater than zero;
- (b) measuring first and second parameters of locomotive operation, said parameters being chosen such that differential of the first with respect to the second is uniquely related to differential of adhesion with respect to creepage, and measuring level of generator excitation;
- (c) calculating in the microprocessor a representation of the differential of adhesion with respect to creepage, utilizing the first and second parameters;
- (d) comparing said representation of the differential of adhesion with respect to creepage with the adhesion window to determine if the locomotive is operating within the window;
- (e) adjusting the lever of generator excitation in response to the comparison made in step (d) so as to move the locomotive operation into the adhesion window; and
- (f) successively repeating steps (b) through (e) to maintain the locomotive operation in the adhesion window.

23. The method of claim 22 further comprising steps of comparing the differential of adhesion with respect to creepage to a predetermined value and operating the rail-cleaning device in response to said comparison.

24. The method of claim 22 further comprising steps of calculating a representation of the creepage and comparing said representation to a predetermined threshold and turning on the sand applicator when the creepage exceeds the threshold.

25. The method of claim 22 wherein the first parameter is adhesion and the second parameter is creepage.

26. A method of maintaining stability in the contact between a rail and a locomotive drive wheel, with positive resistance offered by the contact to a slight increase in the torque applied to the drive wheel, comprising steps of:
- (a) measuring first and second parameters of locomotive operation, said parameters being chosen such that differential of the first with respect to the second is uniquely related to differential of adhesion with respect to creepage;
- (b) calculating a representation of the differential of adhesion with respect to creepage, utilizing the first and second parameters; and
- (c) adjusting the power applied to the locomotive drive train in response to said calculated representation such that the differential of adhesion with respect to creepage is within an optimum range defined as an adhesion window and wherein the adhesion window is defined such that within the window the differential of adhesion with respect to creepage is greater than zero.

* * * * *